Feb. 15, 1949.         J. D. GIBSON         2,461,598
PROCESS FOR THE ISOMERIZATION OF PARAFFINS
Filed Jan. 1, 1944
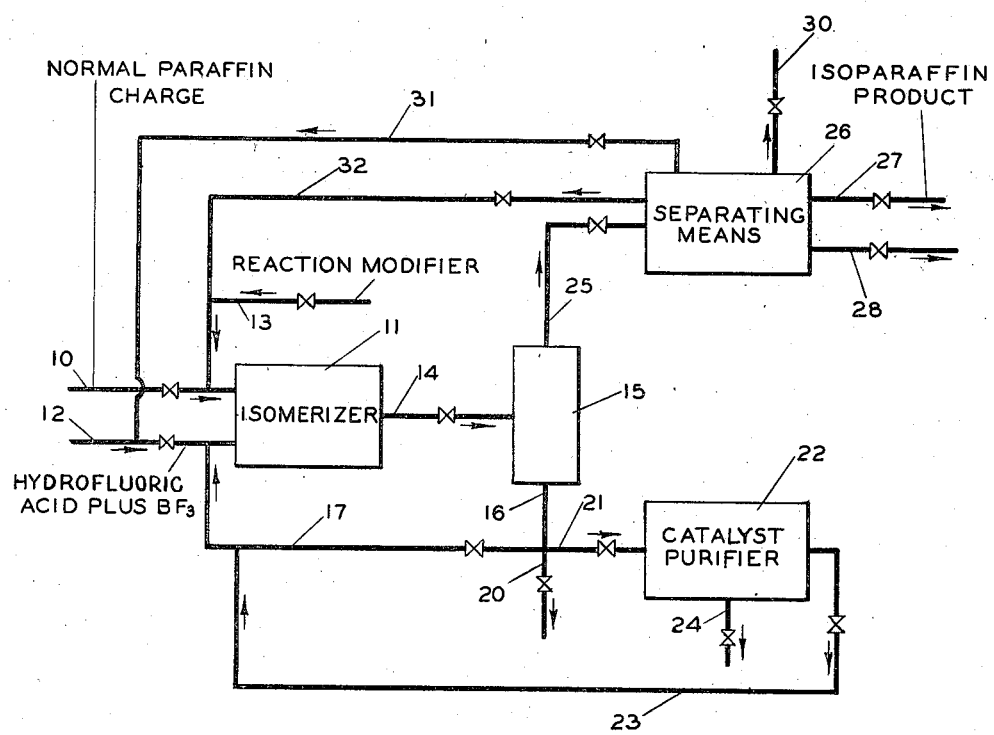
INVENTOR
JAMES D. GIBSON
BY *Hudson, Young & Yinger*
ATTORNEYS Patented Feb. 15, 1949

2,461,598

UNITED STATES PATENT OFFICE 2,461,598

PROCESS FOR THE ISOMERIZATION OF PARAFFINS

James D. Gibson, Bartlesville, Okla., assignor to Phillips Petroleum Company, a corporation of Delaware Application January 1, 1944, Serial No. 516,659

19 Claims. (Cl. 260—683.5)

1

This invention relates to the isomerization of paraffin hydrocarbons. In a specific embodiment it relates to the isomerization of low-boiling paraffin hydrocarbons in the presence of liquid hydrofluoric acid as the isomerization catalyst, and in the presence of a low-boiling aromatic hydrocarbon as a reaction modifier. A still more specific embodiment relates to the isomerization of a paraffin hydrocarbon having at least 5 carbon atoms per molecule and boiling below about 450° F., in the presence of a catalyst comprising hydrofluoric acid and a minor proportion of boron trifluoride and in the presence, as a reaction modifier, of benzene.

The conversion of paraffin hydrocarbons, in the presence of hydrofluoric acid as the conversion catalyst, appears to take place by two different reactions. The first of these reactions is straight-forward isomerization as when normal pentane is converted to isopentane. The second of these reactions involves the production of paraffin hydrocarbons having both higher and lower molecular weights than the paraffin hydrocarbon converted, as when two molecules of a pentane are converted to one molecule of a butane and one molecule of a hexane. Generally the paraffins so produced have a branched-chain structure. It appears that these reactions occur concomitantly so that under ordinary reaction conditions and in the absence of reaction modifiers it is not possible to convert paraffin hydrocarbons without obtaining products resulting from both of these reactions.

I have found now that when paraffin hydrocarbons are converted to other paraffin hydrocarbons in the presence of concentrated hydrofluoric acid as the conversion catalyst the second of the above reactions may be substantially and often completely suppressed by incorporating in the reaction mixture a low-boiling aromatic hydrocarbon. Thus I can convert a normal paraffin such as normal pentane to an isomeric form, in this case 2-methylbutane, with negligible production of hydrocarbons such as butanes and hexanes by incorporating in the reaction mixture an aromatic hydrocarbon such as benzene, toluene, a xylene, ethyl benzene, an ethyl toluene, or the like. As catalysts I prefer to use one in which the essential catalytic material is hydrofluoride acid, and generally I prefer to associate with the hydrofluoric acid a minor amount of boron trifluoride, preferably not more than 10 per cent by weight of the catalyst mixture, and generally not more than about 1 to 5 per cent by weight is sufficient.

2

An object of this invention is to isomerize low-boiling paraffin hydrocarbons.

Another object of this invention is to isomerize a low-boiling paraffin hydrocarbon in the presence of concentrated hydrofluoric acid as the essential isomerization catalyst without converting said paraffin hydrocarbon to paraffins having higher or lower molecular weights.

A further object of this invention is to provide an economical process for converting normal butane, normal pentane, normal hexane, or normal heptane to corresponding isomeric paraffin hydrocarbons.

A further object of this invention is to convert normal hexane to neohexane.

A still further object of this invention is to produce diisopropyl from a less highly branched hexane.

Still another object of this invention is to improve the octane number of a low-boiling, liquid, paraffinic hydrocarbon fraction.

Other objects and advantages of this invention will become apparent to one skilled in the art from the accompanying disclosure and discussion.

The catalyst employed in the practice of my invention is essentially hydrogen fluoride and is preferably employed in the liquid phase. A more active modification of the catalyst comprises liquid hydrogen fluoride associated with a minor amount of boron trifluoride which need not exceed about 10 per cent by weight of the total catalyst, and is preferably between about 0.1 and about 5 to 7 per cent by weight of the total catalyst. No nickel or other catalytic agent is required and in many cases the reactions may be carried out at temperatures near or only slightly above atmospheric, preferably at a temperature between about 50 and about 300° F. Although the catalyst can be recovered in substantially unchanged condition at the end of the reaction and can be re-used many times, there is generally associated with the used catalyst a small amount of organic matter. It is well to see to it that this organic matter does not accumulate to too great an extent, and when the catalyst is re-used it is well to subject at least a portion of it to a purification treatment to remove such organic matter. The amount of organic matter formed can often be reduced by incorporating with the catalyst a minor amount of water, and generally this amount need not exceed about 1 per cent of the catalyst mixture. When boron trifluoride is used as a component of the catalyst it should exceed the molecular equivalent of the water present since it appears that water disappears as such and enters into a combination with the boron trifluoride. Even in the absence of boron trifluoride the water disappears as such and apparently enters into a combination with the hydrogen fluoride. Although the reaction will take place in the vapor phase it is preferred to have both the catalyst and the reactants present in liquid phase and the pressure on the system should be such that it exceeds the total vapor pressure of the reaction mixture. The amount of catalyst present should be such that when operating in the liquid phase separate catalyst and hydrocarbon phases exist, and a ratio of catalyst to hydrocarbon phases between about 0.1:1 and about 3:1 should be used. The catalyst and the hydrocarbon reactants should be brought into and maintained in intimate contact during the reaction period. Preferably such contact is effected by a mechanical mixing which results in substantial emulsification of the two phases. Satisfactorily efficient mixing may be secured by means of a mixing pump, by passing the mixture at a high velocity through a series of baffles, by injecting the hydrocarbon charge at a high velocity through a jet into a body of the reaction mixture, by recirculation of the reaction mixture in a closed cycle, or the like as can be readily effected by one skilled in the art. When the reaction is carried out in a long reaction zone of restricted cross-sectional area as in a tube coil, it may be found desirable to add one or more components of the catalyst at various points along the length of the reaction zone. The reaction time should be such as to effect a substantial amount of isomerization of the paraffin charge; the reaction time will vary somewhat inversely with the temperature and more or less directly with the concentration of the aromatic hydrocarbon employed as a reaction modifier. Thus with higher concentrations of aromatic hydrocarbon longer reaction times may be employed, other conditions being constant, without effecting unduly large amounts of reactions other than the desired isomerization reaction. Generally a reaction time less than about two hours will be satisfactory, preferably one between about 10 and about 30 minutes. The amount of aromatic hydrocarbon employed ordinarily need not exceed about 5 per cent by weight of the total hydrocarbon charge, and I have found that at least about 0.05 per cent by weight should be employed in order to obtain substantial benefits from the invention. A preferred range is between about 0.5 and about 1.5 per cent by weight.

An understanding of various aspects of my invention may be aided by referring to the accompanying drawing and the discussion thereof. This drawing is a schematic flow diagram showing one arrangement of apparatus which may be used in the practice of one embodiment of the invention. It will be readily appreciated that this drawing is in the nature of a flow diagram and that numerous individual pieces of equipment including pumps, compressors, heat exchangers, fractionating columns, etc. will be needed in any specific application of my invention.

Referring now to the drawing, a paraffin hydrocarbon such as normal pentane is introduced through pipe 10 to isomerizer 11. A suitable catalyst such as liquid concentrated hydrofluoric acid containing about 5 per cent by weight of dissolved boron trifluoride is passed to the isomerizer through pipe 12 in an amount substantially equivalent to the liquid volume of the paraffin charged through pipe 10. An aromatic hydrocarbon such as benzene is passed to isomerizer 11 as a reaction modifier through pipe 13 in an amount such as between about 0.5 and 1.5 per cent of the total hydrocarbon material charged through pipes 10 and 13. In isomerizer 11 the reaction mixture is maintained in intimate admixture at a reaction temperature such as about 150° F. for a suitable reaction time such as about 20 minutes. A portion of the reaction mixture is then passed from isomerizer 11 through pipe 14 to separator 15 wherein a separation takes place between a lighter hydrocarbon phase and a heavier liquid hydrofluoric acid phase. If desired the temperature of the separation in separating means 15 may be substantially the same as, or appreciably lower than, the reaction temperature; any cooling may be effected by cooling means not shown.

From separator 15 the catalyst phase is removed through pipe 16 and at least a substantial portion thereof may be returned through pipe 17 to pipe 12 and into isomerizer 11. In order to maintain any impurities at a desired low value, a portion of this catalyst may be withdrawn either intermittently or continuously through pipe 20 and discharged from the system, or may be passed through pipe 21 to catalyst purifier 22. In catalyst purifier 22 the impurities may be removed as by distilling a substantially pure fraction comprising hydrogen fluoride and boron trifluoride from heavier impurities. The purified catalyst may be returned to the system through pipe 23 and the impurities may be discharged through pipe 24.

From separator 15 a hydrocarbon phase may be passed through pipe 25 to separating means 26 where it is fractionated to recover desired product fractions, recycle fractions and the like. Suitable product fractions, such as isopentane, may be withdrawn from the system through pipe 27 and/or pipe 28. Any light gases which are undesired may be discharged through pipe 30. A low-boiling fraction, comprising primarily hydrogen fluoride and boron trifluoride dissolved in the hydrocarbon phase passed through pipe 25, may be separated and returned to the system through pipe 31. A suitable recycle stream comprising unreacted paraffins such as unreacted normal pentane can be separated and returned through pipe 32. The stream passing through pipe 32 may also comprise an aromatic hydrocarbon which is suitable for use as the reaction modifier. In some instances, however, it may be found desirable to incorporate a part or all of the aromatic hydrocarbon in the effluents from the isomerization reactions as a part of the product removed through pipe 27, or pipe 28.

Although at present my invention is applied primarily to the conversion of normal or moderately branched hydrocarbons to more highly branched hydrocarbons it will be understood that isomerization may also take place in the reverse direction if such is desirable, as when isopentane is converted to normal pentane, and that my invention applies equally well to this isomerization. My invention is further exemplified by various runs reported in the following examples. In each of these examples runs which comprise my invention are contrasted with conversion runs in which no aromatic hydrocarbon is used as a reaction modifier.

*Example I*

Three runs were made for isomerizing normal pentane to isopentane. The procedure comprised intimately contacting normal pentane with approximately an equal weight of substantially anhydrous hydrofluoric acid, to which had been added a minor proportion of boron trifluoride, in a steel reactor with motor-driven stirrer. In run 1 no benzene was added to the reaction mixture, whereas in run 2 a small amount was added, and in run 3 a larger amount was added. The following data were obtained:

| Run | 1 | 2 | 3 |
|---|---|---|---|
| Normal pentane, lb | 12.20 | 12.38 | 1.680 |
| Benzene, lb | 0.00 | 0.11 | .479 |
| Percent by wt. of n-pentane | 0.00 | 0.89 | 28.4 |
| Percent by wt. of total hydrocarbon | 0.00 | 0.88 | 22.0 |
| Hydrofluoric acid, lb | 11.3 | 11.3 | 1.94 |
| Boron trifluoride, lb | 0.306 | 0.290 | .061 |
| Percent by wt. of HF | 2.7 | 2.6 | 3.1 |
| Temperature, °F | 77–90 | 76–81 | 79–90 |
| Contact time, minutes | 34 | 34 | 120 |
| Composition of Hydrocarbon Effluent, wt. percent: | | | |
| Isobutane | 24.3 | 0.0 | 0 |
| Normal butane | 1.2 | | |
| Isopentane | 19.1 | 54.7 | |
| Normal pentane | 29.8 | 44.6 | 78 |
| Hexanes | 14.5 | | |
| Heptanes | 6.1 | | |
| Octanes | 2.3 | 0.0 | 0 |
| Nonanes | 2.0 | | |
| Decanes | 0.4 | | |
| Heavier paraffins | 0.3 | | |
| Benzene | 0.0 | 0.7 | 22 |
| | 100.0 | 100.0 | 100.0 |

It will be observed that the single-pass yield of isopentane in run 2 was 55 per cent, or almost three times the yield of 19 per cent in run 1, and that none of the normal pentane was consumed to form by-product paraffins whereas in run 1 over half of the original normal pentane was consumed to form by-product paraffins. In run 3, too much benzene was present, as no normal pentane was converted, even though the contact time was about four times as long as in the other two runs. With a high temperature and/or a greater amount of boron trifluoride, within the range discussed, some isomerization could probably have been obtained within the same reaction time.

*Example II*

Normal butane was subjected to the catalytic action of hydrofluoric acid in the same manner as described for normal pentane in Example I. In runs 4 and 6 no aromatic hydrocarbon was added, but in run 5 benzene was added in the amount shown. The reaction conditions used, and the results obtained, are shown in the accompanying table.

| Run | 4 | 5 | 6 |
|---|---|---|---|
| Normal butane, lb | 0.16 | 2.18 | 0.14 |
| Benzene, lb | 0.00 | 0.69 | 0.00 |
| Per cent by wt. n-$C_4H_{10}$ | 0.00 | 31.6 | 0.00 |
| Hydrofluoric acid, lb | 0.36 | 2.00 | 0.41 |
| Temperature, °F | 302 | 290 | 515 |
| Contact time, minutes | 120 | 540 | 40 |
| Composition of hydrocarbon effluent, wt. per cent: | | | |
| Methane | | | 0.6 |
| Propane | | | 10.1 |
| Isobutane | 13.4 | | 25.9 |
| N-butane | 82.4 | 79 | 50.8 |
| Isopentane | | | 8.1 |
| N-pentane | 4.2 | | 2.0 |
| Heavier | | | 2.5 |
| Benzene | | 21 | |
| | 100.0 | 100.0 | 100.0 |

The yield of isobutane in run 4 and 13.4 per cent of the original butane; in comparison, no isobutane was formed in run 5, which was made with so much benzene that no reaction whatever occurred, even though the contact time was four and a half times as long at about the same temperature. Run 6 indicates that much more normal butane can be converted at a higher temperature, though some is converted to lower- and higher-boiling paraffins; addition of a minor proportion of benzene would prevent the formation of these paraffins which result from disproportionation.

It will be readily appreciated that various embodiments, and modifications, of my invention can be practiced, by one skilled in the art, in the light of the present disclosure without departing from the spirit of the teachings or from the scope of the claims.

I claim:

1. A process for effecting the isomerization of a low-boiling normally liquid paraffin hydrocarbon with a minimum of conversion to paraffin hydrocarbons of lower and higher molecular weights, which comprises admixing with a low-boiling paraffin hydrocarbon having at least five carbon atoms per molecule a low-boiling aromatic hydrocarbon in an amount not greater than about 5 per cent by weight of the total hydrocarbons, subjecting the resulting admixture to reaction at a temperature between about 50 and about 300° F. in the presence of a liquid catalyst consisting of hydrofluoric acid and between about 0.1 and 10 per cent by weight of boron trifluoride for a reaction time not exceeding about two hours to isomerize said low-boiling paraffin hydrocarbon, and recovering from effluents of said reaction a hydrocarbon fraction containing an isomeric paraffin so produced.

2. A process for converting normal pentane to an isopentane with a minimum of conversion to other paraffin hydrocarbons, which comprises admixing with normal pentane a low-boiling aromatic hydrocarbon in an amount between about 0.5 and about 5 per cent by weight of the total hydrocarbons, subjecting the resulting admixture to reaction at a temperature between about 50 and about 300° F. in the presence of a liquid catalyst consisting of hydrofluoric acid and between about 0.1 and 10 per cent by weight of boron trifluoride for a reaction time not exceeding about two hours to isomerize said normal pentane, and recovering from effluents of said reaction a hydrocarbon fraction containing an isopentane so produced.

3. A process for converting normal hexane to an isohexane with a minimum of conversion to other paraffin hydrocarbons, which comprises admixing with normal hexane a low-boiling aromatic hydrocarbon in an amount between about 0.5 and about 5 per cent by weight of the total hydrocarbons, subjecting the resulting admixture to reaction at a temperature between about 50 and about 300° F. in the presence of a liquid catalyst consisting of hydrofluoric acid and between about 0.1 and 10 per cent by weight of boron trifluoride for a reaction time not exceeding about two hours to isomerize said normal hexane, and recovering from effluents of said reaction a hydrocarbon fraction containing an isohexane so produced.

4. A process for converting normal heptane to an isoheptane with a minimum of conversion to other paraffin hydrocarbons, which comprises admixing with normal heptane a low-boiling aromatic hydrocarbon in an amount between about 0.5 and about 5 per cent by weight of the total hydrocarbons, subjecting the resulting admixture to reaction at a temperature between about 50 and about 300° F. in the presence of a liquid catalyst consisting of hydrofluoric acid and between about 0.1 and 10 per cent by weight of boron trifluoride for a reaction time not exceeding about two hours to isomerize said normal heptane, and recovering from effluents of said reaction a hydrocarbon fraction containing an isoheptane so produced.

5. A process for effecting the isomerization of a low-boiling paraffin hydrocarbon with a minimum of conversion to paraffin hydrocarbons having lower and higher molecular weights, which comprises admixing with a low-boiling isomerizable hydrocarbon a low-boiling aromatic hydrocarbon in an amount not greater than about 5 per cent by weight of the total hydrocarbons, subjecting the resulting admixture to reaction conditions such as to isomerize a substantial proportion of said paraffin hydrocarbon in the presence of an isomerization catalyst consisting of hydrofluoric acid and between about 0.1 and 10 per cent by weight of boron trifluoride, and recovering from effluents of said reaction a hydrocarbon fraction comprising an isomeric paraffin so produced.

6. A process for isomerizing a low-boiling paraffin having at least five carbon atoms per molecule, which comprises subjecting to isomerization a hydrocarbon material, comprising a paraffin hydrocarbon having at least five carbon atoms per molecule and having admixed therewith not more than about 5 per cent by weight of a low boiling aromatic hydrocarbon under isomerization conditions and in the presence of a liquid catalyst consisting of hydrofluoric acid and boron trifluoride in an amount between 0.1 and 5 per cent by weight of the total amount of hydrofluoric acid and boron trifluoride, and recoverizing from effluents of said reaction a fraction containing an isomeric paraffin so produced.

7. The process of claim 2 in which said low-boiling aromatic hydrocarbon is benzene.

8. The process of claim 3 in which said low-boiling aromatic hydrocarbon is toluene.

9. The process of claim 4 in which said low-boiling aromatic hydrocarbon is a xylene.

10. An improved process for converting normal pentane to an isopentane with a minimum of conversion of normal pentane to other paraffin hydrocarbons, which comprises subjecting a hydrocarbon material comprising normal pentane and having admixed therewith a low-boiling aromatic hydrocarbon in an amount between about 0.5 and about 5 per cent by weight of the total hydrocarbons to reaction at an isomerization temperature between about 50 and about 300° F. while intimately admixed with a liquid isomerization catalyst consisting of hydrofluoric acid and between 0.1 and 5 weight per cent of boron trifluoride based on the total weight of catalyst with a ratio of catalyst to hydrocarbon phases between about 0.1:1 and about 3:1 for a reaction time sufficient to convert a substantial proportion of normal pentane to an isopentane, and recovering from effluents of said reaction a hydrocarbon fraction containing an isopentane so produced.

11. The process of claim 10 in which said low-boiling aromatic hydrocarbon is benzene.

12. An improved process for isomerizing a low-boiling paraffin hydrocarbon having at least four carbon atoms per molecule to an isomeric paraffin hydrocarbon with a minimum of conversion of said paraffin hydrocarbon to hydrocarbons having more and fewer carbon atoms per molecule, which comprises subjecting a hydrocarbon material comprising such a paraffin hydrocarbon and having admixed therewith a low-boiling aromatic hydrocarbon in an amount between about 0.5 and about 5 per cent by weight of the total hydrocarbons to an isomerization temperature while intimately admixed with a liquid isomerization catalyst consisting of hydrofluoric acid and between 0.1 and 5 weight per cent of boron trifluoride based on the total weight of catalyst with a ratio of catalyst to hydrocarbon phases between about 0.1:1 and about 3:1 for a reaction time such that a substantial proportion of said paraffin hydrocarbon is isomerized, and recovering from effluents of said process a hydrocarbon fraction containing an isomeric paraffin hydrocarbon so produced.

13. A process for converting normal heptane to an isoheptane with a minimum of conversion to other paraffin hydrocarbons, which comprises admixing with normal heptane a low-boiling aromatic hydrocarbon in an amount between about 0.5 and about 5 per cent by weight of the total hydrocarbons, subjecting the resulting admixture to reaction at a temperature between about 100 and about 300° F. in the presence of a liquid catalyst consisting of hydrofluoric acid and boron trifluoride, the boron trifluoride being present in the catalyst in minor amount for a reaction time not exceeding about two hours to isomerize said normal heptane, and recovering from effluents of said reaction a hydrocarbon fraction containing an isoheptane so produced.

14. A process for converting normal heptane to an isoheptane with a minimum of conversion to other paraffin hydrocarbons, which comprises admixing with normal heptane a low-boiling aromatic hydrocarbon in an amount between about 0.5 and about 5 per cent by weight of the total hydrocarbons, subjecting the resulting admixture to reaction at an isomerization temperature in the presence of a liquid catalyst consisting of hydrofluoric acid and boron trifluoride, the boron trifluoride being present in the catalyst in minor amount for a reaction time not exceeding about two hours to isomerize said normal heptane, and recovering from effluents of said reaction a hydrocarbon fraction containing an isoheptane so produced.

15. An improved process for isomerizing a low-boiling paraffin hydrocarbon having at least four carbon atoms per molecule to an isomeric paraffin hydrocarbon with a minimum of conversion of said paraffin hydrocarbon to hydrocarbons having more and fewer carbon atoms per molecule, which comprises subjecting a hydrocarbon material comprising such a paraffin hydrocarbon and having admixed therewith a low-boiling aromatic hydrocarbon in an amount between about 0.5 and about 5 per cent by weight of the total hydrocarbons to an isomerization temperature while intimately admixed with a liquid isomerization catalyst consisting of hydrofluoric acid and boron trifluoride, the boron trifluoride being present in the catalyst in minor amount with a ratio of catalyst to hydrocarbon phases between about 0.1:1 and about 3:1 for a reaction time such that a substantial proportion of said paraffin hydrocarbon is isomerized, and recovering from effluents of said process a hydrocarbon fraction containing an isomeric paraffin hydrocarbon so produced.

16. A process for isomerizing a low-boiling paraffin having at least five carbon atoms per molecule, which comprises subjecting to isomerization a hydrocarbon material, comprising a paraffin hydrocarbon having at least five carbon atoms per molecule and having admixed therewith not more than about 5 per cent by weight of a low boiling aromatic hydrocarbon under isomerization conditions and in the presence of a liquid catalyst consisting of hydrofluoric acid and boron trifluoride, the boron trifluoride being present in the catalyst in minor amount, and recovering from effluents of said reaction a fraction containing an isomeric paraffin so produced.

17. A process for converting normal heptane to an isoheptane with a minimum of conversion to other paraffin hydrocarbons, which comprises admixing with normal heptane a low-boiling aromatic hydrocarbon in an amount between about 0.5 and about 5 per cent by weight of the total hydrocarbons, subjecting the resulting admixture to reaction at a temperature between about 100 and about 300° F. in the presence of a liquid catalyst consisting of hydrofluoric acid and boron trifluoride, the boron trifluoride being present in the catalyst in minor amount for a reaction time not exceeding about 1 hour to isomerize said normal heptane, and recovering from effluents of said reaction a hydrocarbon fraction containing an isoheptane so produced.

18. A process for converting normal heptane to an isoheptane with a minimum of conversion to other paraffin hydrocarbons, which comprises admixing with normal heptane a low-boiling aromatic hydrocarbon in an amount between about 0.5 and about 5 per cent by weight of the total hydrocarbons, subjecting the resulting admixture to reaction at an isomerization temperature in the presence of a liquid catalyst consisting of hydrofluoric acid and boron trifluoride, the boron trifluoride being present in the catalyst in minor amounts for a reaction time not exceeding about 1 hour to isomerize said normal heptane, and recovering from effluents of said reaction a hydrocarbon fraction containing an isoheptane so produced.

19. A process for effecting the isomerization of a low boiling paraffin hydrocarbon while inhibiting cracking conversion which forms paraffin hydrocarbons of lower and higher molecular weights, which process comprises mixing with a low boiling normally liquid paraffin hydrocarbon which would normally be substantially cracked under the isomerization reaction conditions a low boiling aromatic hydrocarbon in an amount sufficient substantially to inhibit said cracking conversion but insufficient to increase the aromatic hydrocarbon concentration in the resultant mixture to more than about 5 percent by weight, subjecting the resultant mixture to isomerization reaction conditions in contact with an isomerization catalyst consisting essentially of hydrogen fluoride and boron trifluoride, the boron trifluoride being present in the catalyst in minor amount, and recovering from the effluents of said isomerization reaction a hydrocarbon fraction containing an isomeric paraffin so produced.

JAMES D. GIBSON.

REFERENCES CITED

The following references are of record in the file of this patent:

UNITED STATES PATENTS

| Number | Name | Date |
|---|---|---|
| 2,250,118 | Smithuysen | July 22, 1941 |
| 2,318,226 | Ipatieff et al. | May 4, 1943 |
| 2,322,664 | Russell | June 22, 1943 |
| 2,325,222 | Ipatieff et al. | July 27, 1943 |
| 2,342,677 | Linn | Feb. 29, 1944 |
| 2,344,889 | Lynch et al. | Mar. 21, 1944 |
| 2,347,317 | Gibson | Apr. 25, 1944 |
| 2,357,495 | Block | Sept. 5, 1944 |

FOREIGN PATENTS

| Number | Country | Date |
|---|---|---|
| 24,044 | India | May 25, 1937 |

Certificate of Correction

February 15, 1949.

Patent No. 2,461,598.

JAMES D. GIBSON

It is hereby certified that error appears in the printed specification of the above numbered patent requiring correction as follows:

Column 5, line 73, for the word "and" read *was*; and that the said Letters Patent should be read with this correction therein that the same may conform to the record of the case in the Patent Office.

Signed and sealed this 5th day of July, A. D. 1949.

[SEAL]

THOMAS F. MURPHY,
*Assistant Commissioner of Patents.*